(12) United States Patent
Zhang et al.

(10) Patent No.: US 10,705,524 B2
(45) Date of Patent: Jul. 7, 2020

(54) TASK EXECUTION METHOD AND DEVICE, MOVEABLE OBJECT AND COMPUTER READABLE STORAGE MEDIUM

(71) Applicant: AUTEL ROBOTICS CO., LTD., Shenzhen, Guangdong (CN)

(72) Inventors: Ke Zhang, Guangdong (CN); Bo Zang, Guangdong (CN)

(73) Assignee: AUTEL ROBOTICS CO., LTD., Shenzhen, Guangdong (CN)

( * ) Notice: Subject to any disclaimer, the term of this patent is extended or adjusted under 35 U.S.C. 154(b) by 182 days.

(21) Appl. No.: 15/850,628

(22) Filed: Dec. 21, 2017

(65) Prior Publication Data
US 2019/0163184 A1 May 30, 2019

Related U.S. Application Data

(63) Continuation of application No. PCT/CN2017/112856, filed on Nov. 24, 2017.

(51) Int. Cl.
| G05D 1/00 | (2006.01) |
| G06Q 10/00 | (2012.01) |
| G05D 1/02 | (2020.01) |
| B64C 39/02 | (2006.01) |
| G05B 17/02 | (2006.01) |

(52) U.S. Cl.
CPC ......... G05D 1/0088 (2013.01); G05D 1/0217 (2013.01); G06Q 10/00 (2013.01); B64C 39/024 (2013.01); G05B 17/02 (2013.01)

(58) Field of Classification Search
None
See application file for complete search history.

(56) References Cited

U.S. PATENT DOCUMENTS

| 2006/0271287 A1* | 11/2006 | Gold ...................... G01C 21/26 |
| | | 701/426 |
| 2010/0211302 A1* | 8/2010 | Ribbe .................. G08G 5/0039 |
| | | 701/120 |
| 2012/0041673 A1* | 2/2012 | Vandivier .......... G01C 21/3614 |
| | | 701/426 |
| 2014/0046585 A1 | 2/2014 | Morris, IV et al. |
| 2015/0298565 A1* | 10/2015 | Iwamura ............ G01C 21/3476 |
| | | 701/22 |
| 2016/0371895 A1* | 12/2016 | Jayanthi ................. H04W 4/024 |
| 2017/0030728 A1* | 2/2017 | Baglino ............. G01C 21/3469 |
| 2018/0283896 A1* | 10/2018 | Piemonte ........... G01C 21/3664 |

FOREIGN PATENT DOCUMENTS

| CN | 104615143 A | 5/2015 |
| CN | 106774393 A | 5/2017 |
| CN | 107103164 A | 8/2017 |
| CN | 107289953 A | 10/2017 |

OTHER PUBLICATIONS

Supplementary European Search Report dated Oct. 8, 2019; Appln. No. EP17814295.

* cited by examiner

*Primary Examiner* — Wynuel S Aquino (57) ABSTRACT

The present invention provides a task execution method and device. The task execution method includes: obtaining a task list, where the task list includes at least two to-be-executed tasks; determining a task mode, where the task mode includes a task set mode and a task flow mode; and executing the at least two to-be-executed tasks according to the determined task mode.

24 Claims, 5 Drawing Sheets

TASK EXECUTION METHOD AND DEVICE, MOVEABLE OBJECT AND COMPUTER READABLE STORAGE MEDIUM

CROSS REFERENCE

This application is a continuation of International Application No. PCT/CN2017/112856, filed on Nov. 24, 2017, the disclosure of which is hereby incorporated by reference in its entirety.

TECHNICAL FIELD

The present invention relates to the field of automatic control, and in particular, to a task execution method and device, a moveable object and a computer readable storage medium.

RELATED ART

With the improvement in design levels and system functions, a moveable object, such as an unmanned aerial vehicle, a robot, a manned aerial vehicle, a model airplane, an unmanned airship, a fixed-wing drone or an unmanned hot-air balloon, may be allowed to carry multiple valid payloads, making it possible to complete multiple tasks only on one trip. However, control complexity is increased due to this. Currently, during a trip, the moveable object requires human participation in decision making or control. This certainly increases time costs and labor costs of task execution of the moveable object, and inevitably results in problems such as misoperation caused by the human participation. Therefore, within the function range supported by the moveable object, how to implement complete autonomous task execution during an entire process based on improvement in the intelligent and automation levels of the moveable object to release labor power is a problem urgently needing to be resolved.

SUMMARY

Based on this, for the foregoing problems in the prior art, it is necessary to provide a task execution method and device, a moveable object and a computer readable storage medium that do not require much human participation in decision making or control and that do not increase time costs and labor costs of task execution of a moveable object, to avoid problems such as misoperation caused by the human participation.

To achieve the foregoing objectives, an embodiment of the present invention provides a task execution method, applied to a moveable object, and including:

obtaining a task list, where the task list includes at least two to-be-executed tasks;

determining a task mode, where the task mode includes a task set mode and a task flow mode, the task set mode refers to that the moveable object executes the at least two to-be-executed tasks according to an optimal path, and the task flow mode refers to that the moveable object executes the at least two to-be-executed tasks according to a user-specified sequence; and executing the at least two to-be-executed tasks according to the determined task mode.

In an embodiment of the present invention, the method further includes: determining a start position of a first executed task in the at least two to-be-executed tasks.

In an embodiment of the present invention, the determining a start position of a first executed task in the at least two to-be-executed tasks includes:

determining a current position of the moveable object;

determining whether the current position matches the start position; and if the current position does not match the start position, adjusting the position of the moveable object until the position matches the start position.

In an embodiment of the present invention, the determining a current position of the moveable object includes:

determining a longitude and a latitude of the moveable object.

In an embodiment of the present invention, the method further includes: determining a height of the moveable object relative to the ground.

In an embodiment of the present invention, the executing the at least two to-be-executed tasks according to the determined task mode includes:

determining, when one of the at least two to-be-executed tasks is completed, whether remaining energy of the moveable object is capable of supporting the moveable object in completing a task that has not been completed in the at least two to-be-executed tasks and returning; and if the remaining energy of the moveable object is not capable of supporting the moveable object in completing the task that has not been completed in the at least two to-be-executed tasks and returning, sending a prompt warning of insufficient energy to a control terminal.

In an embodiment of the present invention, the method further includes:

determining whether the number of times of sending the prompt warning of insufficient energy to the control terminal exceeds a preset threshold; and if the number of times of sending the prompt warning of insufficient energy to the control terminal exceeds the preset threshold, canceling execution of the task that has not been completed and returning.

In an embodiment of the present invention, the method further includes:

determining whether duration of sending the prompt warning of insufficient energy to the control terminal exceeds a preset threshold; and if the duration of sending the prompt warning of insufficient energy to the control terminal exceeds the preset threshold, canceling execution of the task that has not been completed and returning.

In an embodiment of the present invention, the executing the at least two to-be-executed tasks according to the determined task mode includes:

determining, when one of the at least two to-be-executed tasks is completed, whether there is a new task needing to be added to the task list; and if there is a new task needing to be added to the task list, updating the task list.

In an embodiment of the present invention, the executing the at least two to-be-executed tasks according to the determined task mode includes:

determining, when one of the at least two to-be-executed tasks is completed, whether the moveable object has completed all to-be-executed tasks of the at least two to-be-executed tasks.

In an embodiment of the present invention, the task mode is the task set mode, and the method further includes: re-planning a path, and executing the task that has not been completed in the updated task list according to an optimal path.

In an embodiment of the present invention, the determining, when one of the at least two to-be-executed tasks is completed, whether the moveable object has completed all to-be-executed tasks of the at least two to-be-executed tasks includes:

determining whether there is a task that has not been executed by the moveable object in the task list; and if there is no task that has not been executed by the moveable object in the task list, determining that the moveable object has completed all the to-be-executed tasks in the task list.

In an embodiment of the present invention, the task mode is the task flow mode, and the updating the task list includes: listing the new task at the end of the task list.

In an embodiment of the present invention, the determining, when one of the at least two to-be-executed tasks is completed, whether the moveable object has completed all to-be-executed tasks of the at least two to-be-executed tasks includes:

determining whether a task currently executed by the moveable object matches a last executed task in the task list; and if the task currently executed by the moveable object matches the last executed task in the task list, determining that the moveable object has completed all the to-be-executed tasks in the task list.

In an embodiment of the present invention, the executing the at least two to-be-executed tasks according to the determined task mode includes:

determining whether the task list has two tasks that interfere with each other; and if the task list has two tasks that interfere with each other, selecting a task mode again.

In an embodiment of the present invention, the at least two to-be-executed tasks are at least two of the following tasks:

disaster pre-warning, surveying and detection, image collection, detection and tracking, sample extraction and goods delivery.

In an embodiment of the present invention, the moveable object includes any of the following:

an unmanned aerial vehicle, a robot, a manned aerial vehicle, a model airplane, an unmanned airship, a fixed-wing drone or an unmanned hot-air balloon.

To achieve the foregoing objectives, the present invention further provides a task execution device, applied to a moveable object, and including:

an obtaining module, configured to obtain a task list, where the task list includes at least two to-be-executed tasks;

a determining module, configured to determine a task mode, where the task mode includes a task set mode and a task flow mode, the task set mode refers to that the moveable object executes the at least two to-be-executed tasks according to an optimal path, and the task flow mode refers to that the moveable object executes the at least two to-be-executed tasks according to a user-specified sequence; and an execution module, configured to execute the at least two to-be-executed tasks according to the determined task mode.

In an embodiment of the present invention, the device further includes: a start position determining module, configured to determine a start position of a first executed task in the at least two to-be-executed tasks.

In an embodiment of the present invention, the start position determining module is specifically configured to:

determine a current position of the moveable object;

determine whether the current position matches the start position; and if the current position does not match the start position, adjust the position of the moveable object until the position matches the start position.

In an embodiment of the present invention, the current position includes a longitude and a latitude of the moveable object.

In an embodiment of the present invention, the current position further includes a height of the moveable object relative to the ground.

In an embodiment of the present invention, the execution module is specifically configured to:

determine, when one of the at least two to-be-executed tasks is completed, whether remaining energy of the moveable object is capable of supporting the moveable object in completing a task that has not been completed in the at least two to-be-executed tasks and returning; and if the remaining energy of the moveable object is not capable of supporting the moveable object in completing the task that has not been completed in the at least two to-be-executed tasks and returning, send a prompt warning of insufficient energy to a control terminal.

In an embodiment of the present invention, the execution module is further configured to:

determine whether the number of times of sending the prompt warning of insufficient energy to the control terminal exceeds a preset threshold; and if the number of times of sending the prompt warning of insufficient energy to the control terminal exceeds the preset threshold, control the moveable object to cancel execution of the task that has not been completed and return.

In an embodiment of the present invention, the execution module is further configured to:

determine whether duration of sending the prompt warning of insufficient energy to the control terminal exceeds a preset threshold; and if the duration of sending the prompt warning of insufficient energy to the control terminal exceeds the preset threshold, control the moveable object to cancel execution of the task that has not been completed and return.

In an embodiment of the present invention, the execution module is specifically configured to:

determine, when one of the at least two to-be-executed tasks is completed, whether there is a new task needing to be added to the task list; and if there is a new task needing to be added to the task list, update the task list.

In an embodiment of the present invention, the execution module is specifically configured to determine, when one of the at least two to-be-executed tasks is completed, whether the moveable object has completed all to-be-executed tasks of the at least two to-be-executed tasks.

In an embodiment of the present invention, the task mode is the task set mode, and the execution module is specifically configured to re-plan a path, and execute the task that has not been completed in the updated task list according to an optimal path.

In an embodiment of the present invention, the execution module is specifically configured to:

determine whether there is a task that has not been executed by the moveable object in the task list; and if there is no task that has not been executed by the moveable object in the task list, determine that the moveable object has completed all the to-be-executed tasks in the task list.

In an embodiment of the present invention, the task mode is the task flow mode, and the execution module is specifically configured to list the new task at the end of the task list.

In an embodiment of the present invention, the execution module is specifically configured to:

determine whether a task currently executed by the moveable object matches a last executed task in the task list; and if the task currently executed by the moveable object matches the last executed task in the task list, determine that the moveable object has completed all the to-be-executed tasks in the task list.

In an embodiment of the present invention, the execution module is further configured to:

determine whether the task list has two tasks that interfere with each other; and if the task list has two tasks that interfere with each other, select a task mode again.

In an embodiment of the present invention, the at least two to-be-executed tasks are at least two of the following tasks:

disaster pre-warning, surveying and detection, image collection, detection and tracking, sample extraction and goods delivery.

In an embodiment of the present invention, the moveable object includes any of the following:

an unmanned aerial vehicle, a robot, a manned aerial vehicle, a model airplane, an unmanned airship, a fixed-wing drone or an unmanned hot-air balloon.

To achieve the foregoing objectives, the present invention further provides a moveable object, including:

a body; and a processor, which is disposed in the body, where the processor is configured to:

obtain a task list, where the task list includes at least two to-be-executed tasks;

determine a task mode, where the task mode includes a task set mode and a task flow mode, the task set mode refers to that the moveable object executes the at least two to-be-executed tasks according to an optimal path, and the task flow mode refers to that the moveable object executes the at least two to-be-executed tasks according to a user-specified sequence; and control, according to the determined task mode, the moveable object to execute the at least two to-be-executed tasks.

In an embodiment of the present invention, the processor is further configured to:

determine a start position of a first executed task in the at least two to-be-executed tasks.

In an embodiment of the present invention, the processor is specifically configured to:

determine a current position of the moveable object;

determine whether the current position matches the start position; and if the current position does not match the start position, adjust the position of the moveable object until the position matches the start position.

In an embodiment of the present invention, the current position includes a longitude and a latitude of the moveable object.

In an embodiment of the present invention, the current position further includes a height of the moveable object relative to the ground.

In an embodiment of the present invention, the processor is specifically configured to:

determine, when one of the at least two to-be-executed tasks is completed, whether remaining energy of the moveable object is capable of supporting the moveable object in completing a task that has not been completed in the at least two to-be-executed tasks and returning; and if the remaining energy of the moveable object is not capable of supporting the moveable object in completing the task that has not been completed in the at least two to-be-executed tasks and returning, send a prompt warning of insufficient energy to a control terminal.

In an embodiment of the present invention, the processor is further configured to determine whether the number of times of sending the prompt warning of insufficient energy to the control terminal exceeds a preset threshold; and if the number of times of sending the prompt warning of insufficient energy to the control terminal exceeds the preset threshold, control the moveable object to cancel execution of the task that has not been completed and return.

In an embodiment of the present invention, the processor is further configured to determine whether duration of sending the prompt warning of insufficient energy to the control terminal exceeds a preset threshold; and if the duration of sending the prompt warning of insufficient energy to the control terminal exceeds the preset threshold, control the moveable object to cancel execution of the task that has not been completed and return.

In an embodiment of the present invention, the processor is configured to:

determine, when one of the at least two to-be-executed tasks is completed, whether there is a new task needing to be added to the task list; and if there is a new task needing to be added to the task list, update the task list.

In an embodiment of the present invention, the processor is specifically configured to determine, when one of the at least two to-be-executed tasks is completed, whether the moveable object has completed all to-be-executed tasks of the at least two to-be-executed tasks.

In an embodiment of the present invention, the task mode is the task set mode, and the processor is further configured to re-plan a path, and execute the task that has not been completed in the updated task list according to an optimal path.

In an embodiment of the present invention, the processor is specifically configured to:

determine whether there is a task that has not been executed by the moveable object in the task list; and if there is no task that has not been executed by the moveable object in the task list, determine that the moveable object has completed all the to-be-executed tasks in the task list.

In an embodiment of the present invention, the task mode is the task flow mode, and the processor is further configured to list the new task at the end of the task list.

In an embodiment of the present invention, the processor is configured to:

determine whether a task currently executed by the moveable object matches a last executed task in the task list; and if the task currently executed by the moveable object matches the last executed task in the task list, determine that the moveable object has completed all the to-be-executed tasks in the task list.

In an embodiment of the present invention, the processor is further configured to:

determine whether the task list has two tasks that interfere with each other; and if the task list has two tasks that interfere with each other, select a task mode again.

In an embodiment of the present invention, the at least two to-be-executed tasks are at least two of the following tasks:

disaster pre-warning, surveying and detection, image collection, detection and tracking, sample extraction and goods delivery.

In an embodiment of the present invention, the moveable object includes any of the following:

an unmanned aerial vehicle, a robot, a manned aerial vehicle, a model airplane, an unmanned airship, a fixed-wing drone or an unmanned hot-air balloon.

To achieve the foregoing objectives, the present invention further provides a moveable object, including a memory and a processor, where the memory stores a computer program, and when the computer program is executed by the processor, the processor is enabled to perform the task execution method described above.

To achieve the foregoing objectives, the present invention further provides a computer readable storage medium, storing a computer program, where when the computer program is executed by a processor, the processor is enabled to perform the task execution method described above.

Beneficial effects of the embodiments of the present invention are that the moveable object may autonomously complete multiple to-be-executed tasks and return according to the obtained task list and the determined task mode, thereby avoiding problems such as misoperation caused by human participation, reducing time costs and labor costs, and further improving work efficiency.

BRIEF DESCRIPTION OF THE DRAWINGS

To describe the technical solutions in specific implementations of the present invention or in the prior art more clearly, the following briefly describes the accompanying drawings required for describing the specific implementations or the prior art. Apparently, the accompanying drawings in the following description show some implementations of the present invention, and a person of ordinary skill in the art may further derive other drawings from these accompanying drawings without creative efforts.

DETAILED DESCRIPTION

The following clearly and completely describes the technical solutions of the present invention with reference to the accompanying drawings. Apparently, the described embodiments are merely some but not all of the embodiments of the present invention. All other embodiments obtained by a person of ordinary skill in the art based on the embodiments of the present invention without creative efforts shall fall within the protection scope of the present invention.

In the description of the present invention, it should be noted that terms "first", "second", and "third" are merely intended for description, and cannot be understood to indicate or imply relative importance.

In addition, technical features related in different implementations of the present invention that are described below may be combined with each other if there is no conflict therebetween.

Embodiments of the present invention provide a task execution method and device that may autonomously complete all to-be-executed tasks in a task list according to the obtained task list and a determined task mode, a moveable object and a computer readable storage medium.

Figure 1:
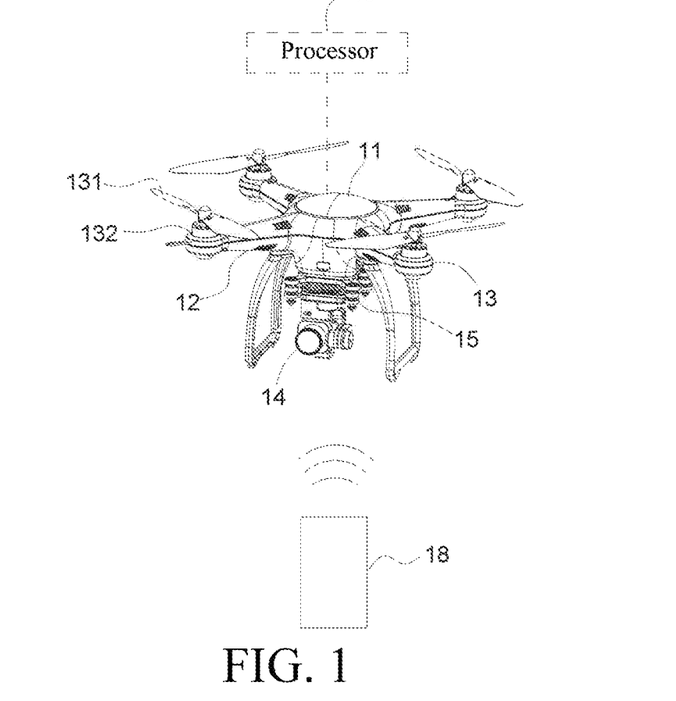
FIG. 1 is a schematic structural diagram of a moveable object according to an embodiment of the present invention.

As shown in FIG. 1, in an embodiment of the present invention, the moveable object is an aircraft. In other possible embodiments, the moveable object may alternatively be a manned aerial vehicle, a robot, an automobile, a boat, a model airplane, an unmanned airship, a fixed-wing aircraft, or an unmanned hot-air balloon. The aircraft in this embodiment of the present invention includes a housing 11, arms 12 connected to the housing 11, power devices 13 disposed on ends of the arms 12, a gimbal 15 connected to the housing 11, an image device 14 connected to the gimbal 13 and a processor 16 disposed in the housing 11. The processor 16 may include multiple functional units, such as a control unit configured to control a flight attitude of the aircraft, a target identification unit configured to identify a target, a tracking unit configured to track a particular target, a navigation unit configured to navigate the aircraft (for example, the Global Positioning System (GPS) or BeiDou), and a data processing unit configured to process environment information obtained by related in-vehicle device (for example, the image device 14).

In this embodiment, the number of the arms 12 is 4, that is, the aircraft is a quad-rotor aircraft. In other possible embodiments, the number of the arms 12 may be 3, 6, 8, 10 or the like.

The power device 13 includes a motor 132 disposed on one end of the arm 12 and a propeller 131 connected to a rotating shaft of the motor 132. The rotating shaft of the motor 132 rotates to drive the propeller 131 to rotate, so as to provide a lifting force for the aircraft.

The gimbal 15 is configured to alleviate or even eliminate vibration transferred by the power devices 13 to the image device 14, so as to ensure that the image device 14 can capture a stable and clear image or video.

The image device 14 may be a binocular camera, a monocular camera, an infrared image device, an ultraviolet image device, a video camera, or a similar apparatus. The image device 14 may be directly carried on the aircraft, or may be carried on the aircraft by using the gimbal 15 shown in this embodiment. The gimbal 15 allows the image device 14 to rotate around at least one shaft relative to the aircraft.

A control terminal 18 may send a control instruction to the aircraft to control the aircraft to execute various tasks. The aircraft may receive, by using a transceiver disposed in the housing 11, the control instruction sent by the control terminal 18. The control terminal 18 may be specifically at least one of a remote control, a signal transmission tower, a satellite, an intelligent terminal or the like.

After the aircraft receive an instruction that is sent by the control terminal 18 and that requires the aircraft to execute a flight task, the processor 16 first obtains a task list, which usually includes at least two to-be-executed tasks. The to-be-executed tasks include, but are not limited to: disaster pre-warning, surveying and detection, image collection, detection and tracking, sample extraction and goods delivery.

The tasks need to be supported by different valid payloads. For example, for image collection, the valid payloads include the a gimbal 15 and the image device 14; and for forest fire pre-warning, the valid payload is an infrared sensor. When requirements on weight, flight quality, and structural layout of the aircraft are satisfied, the aircraft may carry multiple valid payloads, and may execute multiple tasks at a time by means of a unified interface design.

In an embodiment of the present invention, the processor 16 obtains the task list. It may be that the processor 16 sends a request of obtaining the task list to the control terminal 18, or may be that the processor 16 initiatively invokes the task list pre-stored in the aircraft.

Figure 2:
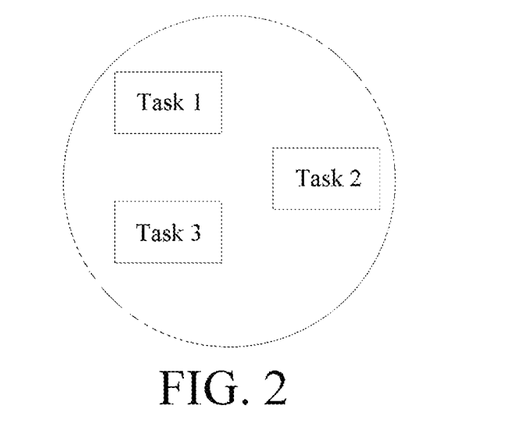
FIG. 2 is a schematic diagram of a task set mode according to an embodiment of the present invention.
Figure 3:
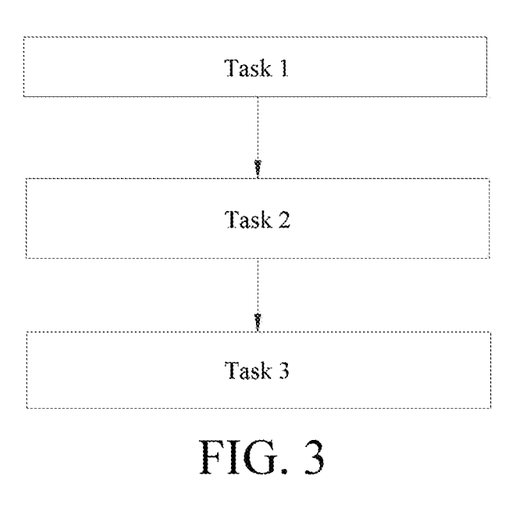
FIG. 3 is a schematic diagram of a task flow mode according to an embodiment of the present invention.

After obtaining the task list, the processor 16 needs to determine a task mode. The task mode may be selected by the control terminal 18, or may be autonomously selected by the aircraft. In the embodiments of the present invention, the task mode includes a task set mode and a task flow mode. As shown in FIG. 2 and FIG. 3, the task set mode refers to that the aircraft executes a task in the task list according to an optimal path, and the task flow mode refers to that the aircraft executes tasks in the task list according to a user-specified sequence.

In the task set mode, only a start point of a task and various tasks needing to be executed need to be recorded, a sequence of the tasks does not need to be recorded, provided that it is ensured that all tasks have been executed after the aircraft completes a flight close loop. Relatively, in the task flow mode, a design sequence of a user need to be recorded, and the tasks need to be strictly executed according to the sequence of the tasks during a flight. If the task mode is determined to be the task set mode, the processor 16 may plan, without being restricted by a sequence of executing the tasks, the optimal path according to a principle of saving energy the most by using a mature optimization algorithm such as an embedded simulated annealing algorithm or an ant colony algorithm. Moreover, a task that has not been completed may be re-planed after each task is completed, to ensure that energy utilization of the aircraft is the highest. However, if execution of a previous task affects a subsequent task or tasks are divided into different importance degrees, it is more appropriate to select the task flow mode.

In an embodiment of the present invention, when two or more tasks interfere with each other, the processor may determine the task mode again or send a prompt warning to the control terminal 18, to prompt the user to select the task mode again, so as to avoid unsafe conditions during the execution.

That the two or more tasks interfere with each other refers to a case in which some tasks cannot be executed because of a limitation to a working condition of the valid payload carried by the aircraft or a limitation to a task attribute. For example, when the weight or volume of a placed article is relatively large, loading of other valid payloads or works may be interfered, for example, capturing of the image device 14 is partially shielded.

The obtaining the task list and the determining the task mode both are pre-interactive processes. The pre-interactive process supports designing and storing multiple task lists, that is, the user may design multiple task lists at once; and certainly, also supports adding or deleting a task at any time. The stored task lists, when initialized, are all represented in an interface according to requirements, so as to be selected by the user.

After the task mode is determined, the processor 16 controls, according to the determined task mode, the aircraft to execute a task in the task list. In an embodiment of the present invention, the processor 16 further needs to determine a start position of a first executed task in the task list and whether a current position of the aircraft matches, that is, is consists with, the start position of the first executed task. If the current position of the aircraft is not consistent with the start position of the first executed task, the processor 16 needs to adjust the position of the aircraft until the position matches the start position. In an embodiment of the present invention, the current position of the aircraft is described by using a longitude, a latitude, and a height of the aircraft relative to the ground. The task can be executed only when the current position of the aircraft matches the start position of the first executed task.

In an embodiment of the present invention, after the aircraft completes a task, the processor 16 needs to determine whether there is a new task needing to be added to the task list; and if there is a new task needing to be added to the task list, needs to update the task list. For example, after the aircraft completes a task, the user adds a new task by using the control terminal 18. In this case, the processor 16 needs to update the task list. For the task set mode, when a new task is added to the task list, a path needs to be re-planned, and the task that has not been completed in the task list needs to be executed according to the optimal path. However, for the task flow mode, the newly added task may be directly added at the end of the task list.

In an embodiment of the present invention, if there is no new task needing to be added to the task list, the processor 16 may further determine whether the aircraft has completed all to-be-executed tasks in the task list. For the task set mode, the processor 16 only needs to determine whether there is a task that has not been executed by the aircraft in the task list. If there is no task that has not been executed by the aircraft in the task list, it indicates that the aircraft has completed all the to-be-executed tasks in the task list. For the task flow mode, whether a task currently executed by the aircraft matches a last task that needs to be executed in the task list needs to be determined. If the task currently executed by the aircraft matches the last task that needs to be executed in the task list, it indicates that the aircraft has completed all the to-be-executed tasks in the task list.

If a new task is added to the task list, the foregoing determining does not need to be executed. That is, whether the aircraft has completed all the to-be-executed tasks in the task list does not need to be determined because the new added task is not completed at this time.

Regardless of whether the foregoing determining needs to be performed, the processor 16 determines whether remaining energy of the aircraft is capable of supporting the aircraft in completing the task that has not been completed and returning. Energy of the aircraft refers to an electric quantity or a fuel quantity that supports the aircraft in completing a series of operations such as a flight task, a tracking task and a landing action. If the remaining energy of the moveable object is not capable of supporting the moveable object in completing the task that has not been completed and returning, the processor sends a prompt warning of insufficient energy to the control terminal 18, and asks the control terminal 18 for a decision. In an embodiment of the present invention, when the number of times or duration of sending the prompt warning of insufficient energy to the control terminal 18 exceeds a preset threshold, the aircraft cancels execution of the task that has not been completed and flies back automatically.

If not all the to-be-executed tasks in the task list are completed and the energy is sufficient, the aircraft flies to a next target point and executes a next task in the task list.

Figure 4:
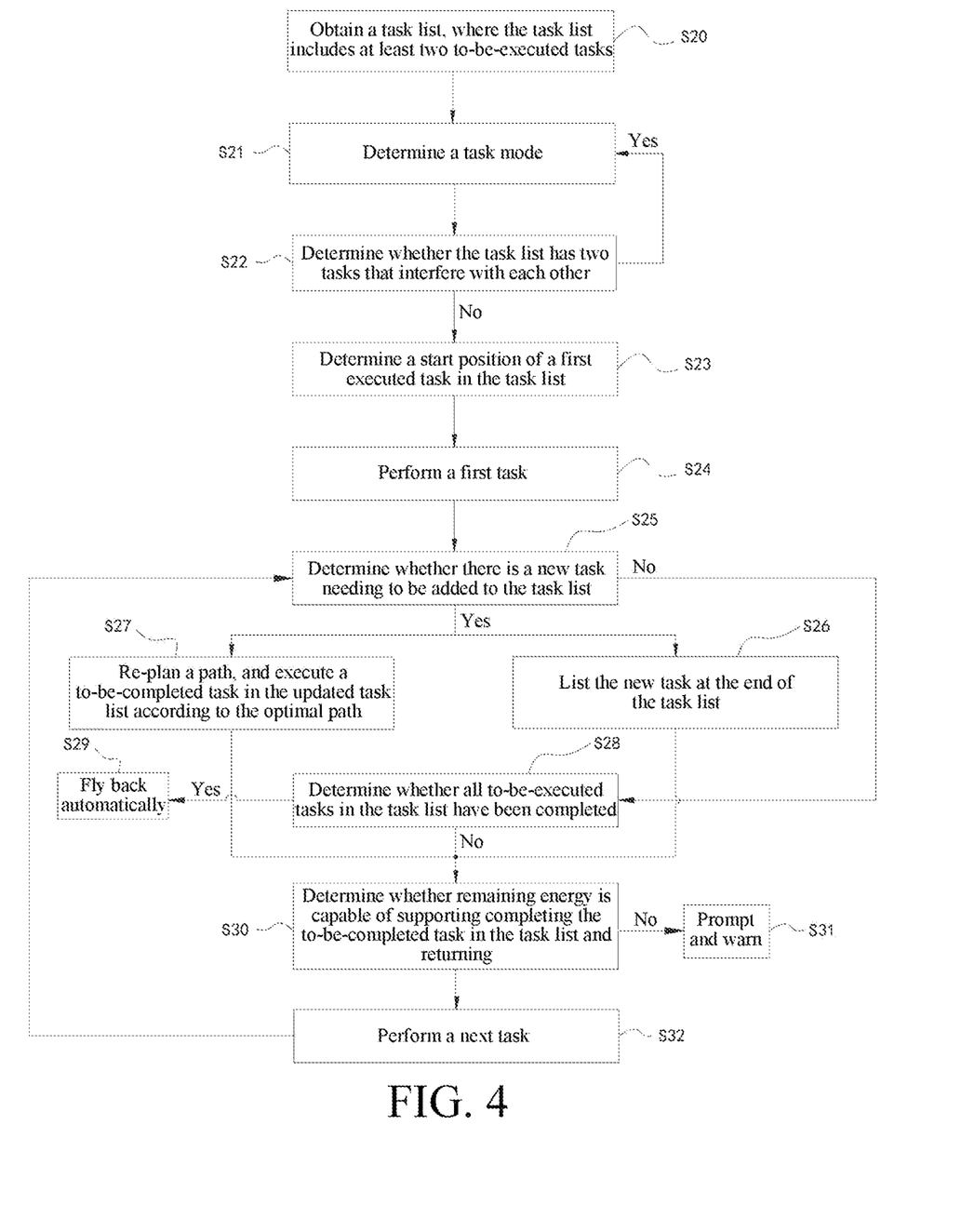
FIG. 4 is a flowchart of a task execution method according to an embodiment of the present invention.

FIG. 4 is a flowchart of a task execution method according to the present invention. The task execution method is applied to a moveable object. In an embodiment of the present invention, the moveable object is an aircraft. The task execution method includes the following steps.

S20. Obtain a task list, where the task list includes at least two to-be-executed tasks.

S21. Determine a task mode, where the task mode includes a task set mode and a task flow mode. The task set mode refers to that the aircraft executes a task in the task list according to an optimal path, and the task flow mode refers to that the aircraft executes tasks of the task list according to a user-specified sequence.

S22. Determine whether the task list has two tasks that interfere with each other; and if the task list has two tasks that interfere with each other, select a task mode again; or if the task list does not have two tasks that interfere with each other, continue to perform the following steps.

S23. Determine a start position of a first executed task in the task list.

In an embodiment of the present invention, this step further includes:

determining a current position of the moveable object;

determining whether the current position of the moveable object matches the start position; and if the current position of the moveable object does not match the start position, adjusting the position of the moveable object until the position matches the start position.

S24. Fly to the start position to execute a first task.

S25. After the first task is completed, determine whether there is a new task needing to be added to the task list, and if there is no new task needing to be added to the task list, perform step S28.

For the task set mode, when a new task is added to the task list, the aircraft needs to perform the following step:

S27. Re-plan a path for a task that has not been completed, and execute the task that has not been completed in the updated task list according to the optimal path.

For the task flow mode, when a new task is added to the task list, the aircraft needs to perform the following steps.

S26. List the new added task at the end of the task list.

S28. Determine whether all to-be-executed tasks of the task list have been completed.

For the task set mode, only whether there is a task that has not been executed by the aircraft in the task list needs to be determined. If there is no task that has not been executed by the aircraft in the task list, it indicates that the aircraft has completed all the to-be-executed tasks in the task list. For the task flow mode, whether a task currently executed by the aircraft matches a last task that needs to be executed in the task list needs to be determined. If the task currently executed by the aircraft matches the last task that needs to be executed in the task list, it indicates that the aircraft has completed all the to-be-executed tasks in the task list.

When a determining result of step S25 is yes, step S28 does not need to be performed.

S30. Determine whether remaining energy of the aircraft is capable of supporting the aircraft in completing the task that has not been completed in the task list and returning, and if the remaining energy of the aircraft is not capable of supporting the aircraft in completing the task that has not been completed in the task list and returning, perform step S31.

S31. Send a prompt warning of insufficient energy to a control terminal.

When the number of times or duration of sending the prompt warning of insufficient energy to the control terminal exceeds a preset threshold, the aircraft cancels execution of the task that has not been executed in the task list and returns.

When there is a task that has not been completed in the task list and the remaining energy of the aircraft is capable of supporting the aircraft in completing the task that has not been completed in the task list and returning, the following step is performed.

S32. Perform a next task in the task list.

After this task is completed, step S25 is continued to be performed, and this process is repeated until the aircraft completes all tasks in the task list.

For detailed content about the steps in the method, reference may be made to the foregoing description, and details are not described herein again.

Figure 5:
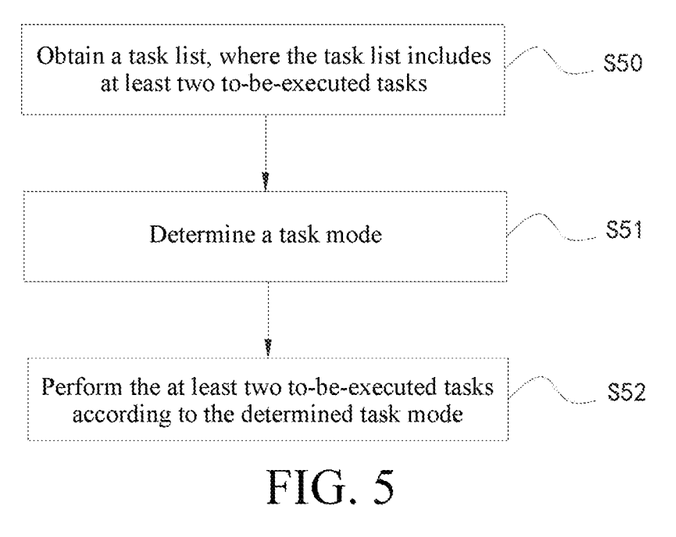
FIG. 5 is a flowchart of a task execution method according to another embodiment of the present invention.

FIG. 5 is a flowchart of a task execution method according to another embodiment of the present invention. The method includes the following steps.

S50. Obtain a task list, where the task list includes at least two to-be-executed tasks.

S51. Determine a task mode, where the task mode includes a task set mode and a task flow mode.

S52. Perform the at least two to-be-executed tasks in the task list according to the determined task mode.

For detailed content about the steps in the method, reference may be made to the foregoing description, and details are not described herein again.

Figure 6:
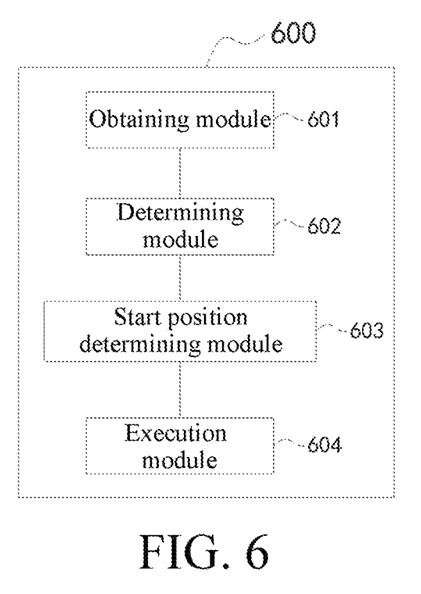
FIG. 6 is a structural block diagram of a task execution device according to an embodiment of the present invention.

FIG. 6 is a structural block diagram of a task execution device according to the present invention. The task execution device 600 is applied to a moveable object, and includes:

an obtaining module 601, configured to obtain a task list, where the task list includes at least two to-be-executed tasks;

a determining module 602, configured to determine a task mode, where the task mode includes a task set mode and a task flow mode, the task set mode refers to that the moveable object executes the at least two to-be-executed tasks according to an optimal path, and the task flow mode refers to that the moveable object executes the at least two to-be-executed tasks according to a user-specified sequence; and an execution module 604, configured to execute the at least two to-be-executed tasks according to the determined task mode.

In an embodiment of the present invention, the device 600 further includes:

a start position determining module 603, configured to determine a start position of a first executed task in the at least two to-be-executed tasks.

In an embodiment of the present invention, the start position determining module 603 is specifically configured to:

determine a current position of the moveable object;

determine whether the current position matches the start position; and if the current position does not match the start position, adjust the position of the moveable object until the position matches the start position.

In an embodiment of the present invention, the current position includes a longitude and a latitude of the moveable object.

In an embodiment of the present invention, the current position further includes a height of the moveable object relative to the ground.

In an embodiment of the present invention, the execution module 604 is specifically configured to:

determine, when one of the at least two to-be-executed tasks is completed, whether remaining energy of the moveable object is capable of supporting the moveable object in completing a task that has not been completed in the at least two to-be-executed tasks and returning; and if the remaining energy of the moveable object is not capable of supporting the moveable object in completing the task that has not been completed in the at least two to-be-executed tasks and returning, send a prompt warning of insufficient energy to a control terminal.

In an embodiment of the present invention, the execution module 604 is further configured to:

determine whether the number of times of sending the prompt warning of insufficient energy to the control terminal exceeds a preset threshold; and if the number of times of sending the prompt warning of insufficient energy to the control terminal exceeds the preset threshold, control the moveable object to cancel execution of the task that has not been completed and return.

In an embodiment of the present invention, the execution module 604 is further configured to:

determine whether duration of sending the prompt warning of insufficient energy to the control terminal exceeds a preset threshold; and if the duration of sending the prompt warning of insufficient energy to the control terminal exceeds the preset threshold, control the moveable object to cancel execution of the task that has not been completed and return.

In an embodiment of the present invention, the execution module 604 is specifically configured to:

determine, when one of the at least two to-be-executed tasks is completed, whether there is a new task needing to be added to the task list; and if there is a new task needing to be added to the task list, update the task list.

In an embodiment of the present invention, the execution module 604 is specifically configured to:

determine, when one of the at least two to-be-executed tasks is completed, whether the moveable object has completed all to-be-executed tasks of the at least two to-be-executed tasks.

In an embodiment of the present invention, the task mode is the task set mode, and the execution module 604 is specifically configured to:

re-plan a path, and execute the task that has not been completed in the updated task list according to the optimal path.

In an embodiment of the present invention, the execution module 604 is specifically configured to:

determine whether there is a task that has not been executed by the moveable object in the task list; and if there is no task that has not been executed by the moveable object in the task list, determine that the moveable object has completed all the to-be-executed tasks in the task list.

In an embodiment of the present invention, the task mode is the task flow mode, and the execution module 604 is specifically configured to:

list the new task at the end of the task list.

In an embodiment of the present invention, the execution module 604 is specifically configured to:

determine whether a task currently executed by the moveable object matches a last executed task in the task list; and if the task currently executed by the moveable object matches the last executed task in the task list, determine that the moveable object has completed all the to-be-executed tasks in the task list.

In an embodiment of the present invention, the execution module 604 is further configured to:

determine whether the task list has two tasks that interfere with each other; and if the task list has two tasks that interfere with each other, select a task mode again.

In an embodiment of the present invention, the at least two to-be-executed tasks are at least two of the following tasks:

disaster pre-warning, surveying and detection, image collection, detection and tracking, sample extraction and goods delivery. In an embodiment of the present invention, the moveable object includes any of the following:

an unmanned aerial vehicle, a robot, a manned aerial vehicle, a model airplane, an unmanned airship, a fixed-wing drone or an unmanned hot-air balloon.

In the embodiments of the present invention, the obtaining module 601, the determining module 602, the start position determining module 603 and the execution module 604 may be the processor 16 in the moveable object shown in FIG. 1.

Figure 7:
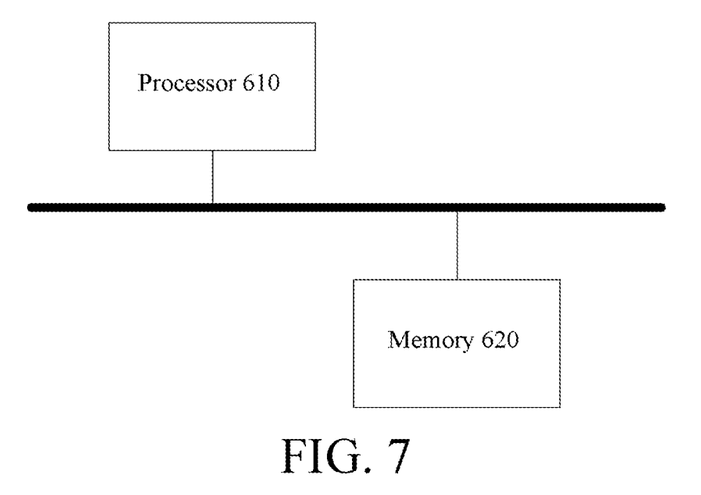
FIG. 7 is a principle diagram of a hardware structure of a moveable object according to an embodiment of the present invention.

An embodiment of the present invention further provides a moveable object. As shown in FIG. 7, the moveable object includes one or more processors 610 and a memory 620. In FIG. 7, one processor 610 is used as an example.

The processor 610 may be connected to the memory 620 by using a bus or in other manners. The processor 610 being connected to the memory 620 by using a bus is used as an example in FIG. 7.

The processor 610 may be a central processing unit (CPU). The processor 610 may alternatively be another general purpose processor, digital signal processor (DSP), application-specific integrated circuit (ASIC), or field programmable gate array (FPGA), or another chip such as a programmable logic device, a discrete gate or transistor logic device, or a discrete hardware component, or a combination of the foregoing chips. The general processor may be a microprocessor or the processor may alternatively be any common processor and the like.

The memory 620, as a non-transitory computer readable storage medium, may be configured to store a non-transitory software program, a non-transitory computer-executable program and module, such as a program instruction/module (for example, the obtaining module 601, the determining module 602, the start position determining module 603 and the execution module 604 shown in FIG. 6) corresponding to a full-automatic flight control method designed based on a task in the embodiments of the present invention. The processor 610 performs various functional applications and data processing of a server by running the non-transitory software program, instruction and module that are stored in the memory 620, that is, implements the task execution method in FIG. 4 and FIG. 5.

The memory 620 may include a program storage area and a data storage area. The program storage area may store an operating system and an application program required by at least one function. The data storage area may store data created according to use of a full-automatic flight control device designed based on a task. In addition, the memory 620 may include a high speed random access memory, and may also include a non-transitory memory such as at least one magnetic disk storage device, a flash memory, or another non-transitory solid-state storage device. In some embodiments, the memory 620 optionally includes memories that are disposed to be remote relative to the processor 610. These remote memories may be connected, by using a network, to a processing device operating list items. Examples of the network include, but are not limited to, Internet, an intranet network, a local area network, a mobile communications network and a combination thereof.

The one or more modules are stored in the memory 620, and perform, when executed by the one or more processors 610, the task execution method in FIG. 4 and FIG. 5.

The foregoing products may perform the method provided in the embodiments of the present invention, and have corresponding functional modules and beneficial effects for performing the method. Reference may be made to related descriptions in the embodiments shown in FIG. 1 to FIG. 4 for technical details that are not described in this embodiment in detail.

Apparently, the foregoing embodiments are merely examples used for clear descriptions, and are not intended to limit the implementations. A person of ordinary skill in the art may further make other different forms of changes or variations based on the foregoing descriptions. All implementations do not need to and cannot be exhaustively listed herein. However, obvious changes or variations derived therefrom shall still fall within the protection scope of the present invention.

What is claimed is:

1. A task execution method, applied to a moveable object, and comprising: obtaining a task list, wherein the task list comprises at least two to-be-executed tasks; determining a task mode, wherein the task mode comprises a task set mode and a task flow mode, the task set mode refers to that the moveable object executes the at least two to-be-executed tasks according to an optimal path, and the task flow mode refers to that the moveable object executes the at least two to-be-executed tasks according to a user-specified sequence; and executing the at least two to-be-executed tasks according to the determined task mode, wherein the executing the at least two to-be-executed tasks according to the determined task mode comprises: determining, when one of the at least two to-be-executed tasks is completed, whether remaining energy of the moveable object is capable of supporting the moveable object in completing a task that has not been completed in the at least two to-be-executed tasks and returning; and if the remaining energy of the moveable object is not capable of supporting the moveable object in completing the task that has not been completed in the at least two to-be-executed tasks and returning, sending a prompt warning of insufficient energy to a control terminal, determining whether a number of times of sending the prompt warning of insufficient energy to the control terminal exceeds a preset threshold and if the number of times or a duration of sending the prompt warning of insufficient energy to the control terminal exceeds the preset threshold, control the moveable object to cancel execution of the task that has not been completed and return the movable object automatically; after the determination of whether the number of times of sending the prompt warning of insufficient energy to the control terminal exceeds the preset threshold, determine a task that has not been completed in the task list and if the remaining energy of the movable object is capable of completing the task that has not been completed, perform a next task in the task list by the movable object according to the determined task mode.

2. The method according to claim 1, further comprising: determining a start position of a first executed task in the at least two to-be-executed tasks.

3. The method according to claim 2, wherein the determining a start position of a first executed task in the at least two to-be-executed tasks comprises:
determining a current position of the moveable object;
determining whether the current position matches the start position; and
if the current position does not match the start position, adjusting the position of the moveable object until the position matches the start position.

4. The method according to claim 3, wherein the determining a current position of the moveable object comprises:
determining a longitude and a latitude of the moveable object or a height of the moveable object relative to the ground.

5. The method according to claim 1, wherein the executing the at least two to-be-executed tasks according to the determined task mode comprises:
determining, when one of the at least two to-be-executed tasks is completed, whether there is a new task needing to be added to the task list; and
if there is a new task needing to be added to the task list, updating the task list.

6. The method according to claim 1, wherein the executing the at least two to-be-executed tasks according to the determined task mode comprises:
determining, when one of the at least two to-be-executed tasks is completed, whether the moveable object has completed all to-be-executed tasks of the at least two to-be-executed tasks.

7. The method according to claim 6, wherein the task mode is the task set mode, and the method further comprises:
re-planning a path, and executing the task that has not been completed in the updated task list according to an optimal path.

8. The method according to claim 7, wherein the, determining, when one of the at least two to-be-executed tasks is completed, whether the moveable object has completed all to-be-executed tasks of the at least two to-be-executed tasks comprises:
determining whether there is a task that has not been executed by the moveable object in the task list; and
if there is no task that has not been executed by the moveable object in the task list, determining that the moveable object has completed all the to-be-executed tasks in the task list.

9. The method according to claim 6, wherein the task mode is the task flow mode, and the updating the task list comprises:
listing the new task at the end of the task list.

10. The method according to claim 9, wherein the determining, when one of the at least two to-be-executed tasks is completed, whether the moveable object has completed all to-be-executed tasks of the at least two to-be-executed tasks comprises:
determining whether a task currently executed by the moveable object matches a last executed task in the task list; and
if the task currently executed by the moveable object matches the last executed task in the task list, determining that the moveable object has completed all the to-be-executed tasks in the task list.

11. The method according to claim 1, wherein the executing the at least two to-be-executed tasks according to the determined task mode comprises:
determining whether the task list has two tasks that interfere with each other; and if the task list has two tasks that interfere with each other, selecting a task mode again.

12. The method according to claim 1, wherein the at least two to-be-executed tasks are at least two of the following tasks:
disaster pre-warning, surveying and detection, image collection, detection and tracking, sample extraction and goods delivery.

13. A moveable object, comprising: a body; and a processor, which is disposed in the body, wherein the processor is configured to: obtain a task list, wherein the task list comprises at least two to-be-executed tasks; determine a task mode, wherein the task mode comprises a task set mode and a task flow mode, the task set mode refers to that the moveable object executes the at least two to-be-executed tasks according to an optimal path, and the task flow mode refers to that the moveable object executes the at least two to-be-executed tasks according to a user-specified sequence; and control, according to the determined task mode, the moveable object to execute the at least two to-be-executed tasks, wherein the processor is specifically configured to: determine, when one of the at least two to-be-executed tasks is completed whether remaining energy of the moveable object is capable of supporting the moveable object in completing a task that has not been completed in the at least two to-be-executed tasks and returning; and if the remaining energy of the moveable object is not capable of supporting the moveable object in completing the task that has not been completed in the at least two to-be-executed tasks and returning, send a prompt warning of insufficient energy to a control terminal wherein the processor is further configured to determine whether a number of times of sending the prompt warning of insufficient energy to the control terminal exceeds a preset threshold; and if the number of times or a duration of sending the prompt warning of insufficient energy to the control terminal exceeds the preset threshold, control the moveable object to cancel execution of the task that has not been completed and return the movable object automatically; after the determination of whether the number of times of sending the prompt warning of insufficient energy to the control terminal exceeds the preset threshold, determine a task that has not been completed in the task list and if the remaining energy of the movable object is capable of completing the task that has not been completed, perform a next task in the task list by the movable object according to the determined task mode.

14. The moveable object according to claim 13, wherein the processor is further configured to:
determine a start position of a first executed task in the at least two to-be-executed tasks.

15. The moveable object according to claim 14, wherein the processor is specifically configured to:
determine a current position of the moveable object;
determine whether the current position matches the start position; and
if the current position does not match the start position, adjust the position of the moveable object until the position matches the start position.

16. The moveable object according to claim 15, wherein the current position comprises a longitude and a latitude of the moveable object or a height of the moveable object relative to the ground.

17. The moveable object according to claim 13, wherein the processor is configured to:
determine, when one of the at least two to-be-executed tasks is completed, whether there is a new task needing to be added to the task list; and
if there is a new task needing to be added to the task list, update the task list.

18. The moveable object according to claim 13, wherein the processor is specifically configured to:
determine, when one of the at least two to-be-executed tasks is completed, whether the moveable object has completed all to-be-executed tasks of the at least two to-be-executed tasks.

19. The moveable object according to claim 18, wherein the task mode is the task set mode, and the processor is further configured to:
re-plan a path, and execute the task that has not been completed in the updated task list according to an optimal path.

20. The moveable object according to claim 19, wherein the processor is specifically configured to:
determine whether there is a task that has not been executed by the moveable object in the task list; and
if there is no task that has not been executed by the moveable object in the task list, determine that the moveable object has completed all to-be-executed tasks in the task list.

21. The moveable object according to claim 18, wherein the task mode is the task flow mode, and the processor is further configured to:
list the new task at the end of the task list.

22. The moveable object according to claim 21, wherein the processor is configured to:
determine whether a task currently executed by the moveable object matches a last executed task in the task list; and
if the task currently executed by the moveable object matches the last executed task in the task list, determine that the moveable object has completed all the to-be-executed tasks in the task list.

23. The moveable object according to claim 13, wherein the processor is further configured to:
determine whether the task list has two tasks that interfere with each other; and
if the task list has two tasks that interfere with each other, select a task mode again.

24. The moveable object according to claim 13, wherein the at least two to-be-executed tasks are at least two of the following tasks:
disaster pre-warning, surveying and detection, image collection, detection and tracking, sample extraction and goods delivery.

* * * * *